United States Patent
Popovich et al.

(10) Patent No.: US 12,135,687 B2
(45) Date of Patent: Nov. 5, 2024

(54) EFFICIENT DETECTION OF DATA CHANGES BETWEEN DIFFERENT DATA REPRESENTATIONS

(71) Applicant: Dell Products, L.P., Round Rock, TX (US)

(72) Inventors: Evgeny Popovich, Port Coquitlam (CA); Oliver Chung, Bellevue, WA (US); Smitha Jaya Shankar, Seattle, WA (US); Austin Voecks, Bainbridge Island, WA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 18/154,258

(22) Filed: Jan. 13, 2023

(65) Prior Publication Data
US 2024/0241855 A1    Jul. 18, 2024

(51) Int. Cl.
*G06F 16/17* (2019.01)
*G06F 16/11* (2019.01)
*G06F 16/174* (2019.01)

(52) U.S. Cl.
CPC ........ *G06F 16/128* (2019.01); *G06F 16/1756* (2019.01)

(58) Field of Classification Search
CPC .............................. G06F 16/128; G06F 16/1756
See application file for complete search history.

(56) References Cited

U.S. PATENT DOCUMENTS

| | | | |
|---|---|---|---|
| 6,247,139 B1 | 6/2001 | Walker | |
| 10,951,704 B1 | 3/2021 | Frank | |
| 2016/0313934 A1 | 10/2016 | Isherwood | |
| 2017/0149886 A1* | 5/2017 | Shetty | G06F 3/065 |
| 2021/0200641 A1* | 7/2021 | Bafna | G06F 16/1734 |
| 2022/0197944 A1* | 6/2022 | Kaplingat | G06F 16/137 |
| 2023/0133361 A1* | 5/2023 | Shilane | G06F 16/2246 |
| | | | 707/664 |

OTHER PUBLICATIONS

White, et al. "SyncIQ Version 2 Design" Sep. 20, 2006, 96 pages. https://eos2git.cec.lab.emc.com/powerscale/tech-doc/blob/master/DDD/synciq/vNone/primer/design.pdf.
Unknown, "SyncIQ Design (Partially updated for 3.0)" Feb. 19, 2010, 93 pages. https://eos2git.cec.lab.emc.com/powerscale/tech-doc/blob/master/DDD/synciq/v3.0/design/design.pdf.
Non-Final OA for U.S. Appl. No. 18/194,668, dated May 21, 2024.
Notice of Allowance received for U.S. Appl. No. 18/194,668 dated Aug. 26, 2024, 30 pages.

* cited by examiner

*Primary Examiner* — Apu M Mofiz
*Assistant Examiner* — Cindy Nguyen
(74) *Attorney, Agent, or Firm* — Amin, Turocy & Watson, LLP

(57) ABSTRACT

The described technology is generally directed towards efficient detection of data changes between different data representations, to enable replication of the detected data changes. A process is presented that compares different "snapshot" representations of data, wherein the data may have changed between the different snapshots. The process can detect changed files a well as namespace changes that occur when a file or directory is deleted, added, or moved to a different location.

20 Claims, 10 Drawing Sheets

|  | Exists in both snapshots | Exists in one snapshot but not the other snapshot | Exists in neither snapshot |
|---|---|---|---|
| File ID is a file | Ignore in the context of namespace changes | Ignore in the context of namespace changes | Ignore |
| File ID is a directory | Process in "Compare Namespaces" step | Ignore in the context of namespace changes | Ignore |

FIG. 4

EFFICIENT DETECTION OF DATA CHANGES BETWEEN DIFFERENT DATA REPRESENTATIONS

BACKGROUND

Data replication is important in many different industries. The average device user is well advised to back up their data, and businesses of every variety also replicate their data to safeguard against temporary and permanent data loss, as well as to ensure continuous availability of data to support business operations. Moreover, enterprises that frequently replicate large volumes of data need to replicate their data efficiently, such as by reducing processing and data transfer volumes involved in replicating data.

Some approaches to replicating data operate by initially creating a baseline copy of the data, followed by detecting and incrementally replicating changes to the data. By replicating detected changes into the baseline copy, there is reduced need to redundantly replicate those aspects of the data which have not changed. These change detection and replication approaches can be much more efficient than replicating data in full each time the data is replicated.

There are different techniques for detecting changes to data, identifying the changes and replicating the changes. The different techniques vary in their efficiency and can be more or less well suited for use with different underlying technologies. Therefore, new and improved data replication techniques are needed to pursue efficiency gains, particularly for enterprises with high data replication requirements.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 4 is a table comprising example actions that can be taken in different processing scenarios, in accordance with one or more embodiments described herein.

DETAILED DESCRIPTION

Figure 1:
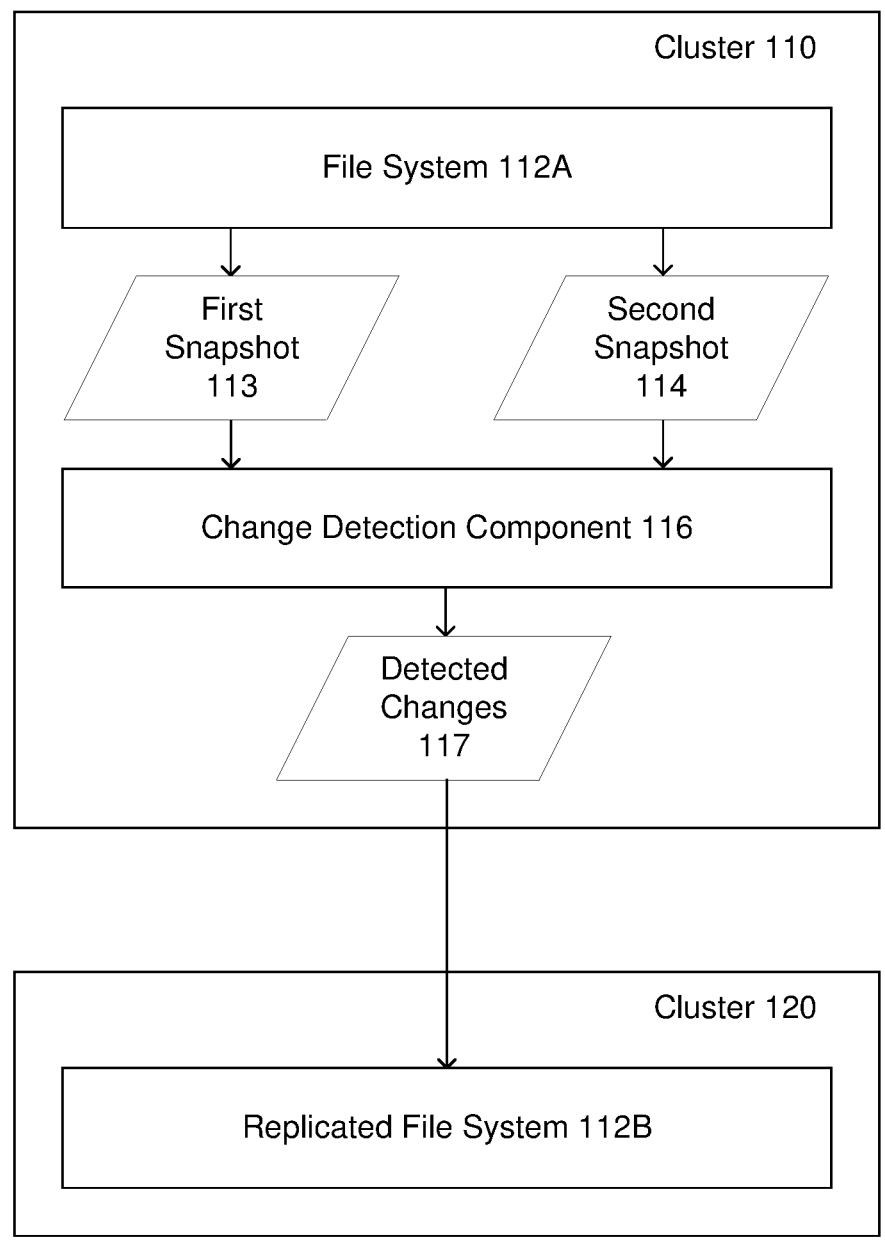
FIG. 1 illustrates example replication of a file system, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The subject application generally relates to data replication, for example, to efficient detection of data changes between different data representations, to enable replication of the detected data changes. Example embodiments are directed towards a process for comparing different "snapshot" representations of data, wherein the data may have changed between the different snapshots. The disclosed process can detect changed files as well as namespace changes that occur when a file or directory is deleted, added, or moved to a different location.

FIG. 1 illustrates example replication of a file system, in accordance with one or more embodiments described herein. FIG. 1 comprises a first cluster 110 and a second cluster 120. A file system 112A is stored at the first cluster 110, and a replicated file system 112B is stored at the second cluster 120, wherein the replicated file system 112B is a replication of the file system 112A.

The file system 112A and/or the cluster 110 can include a snapshot feature which produces snapshots of the file system 112A. A first snapshot 113 can comprise a first representation of the file system 112A, e.g., a representation of the file system 112A at a first point in time. A second snapshot 114 can comprise a second representation of the file system 112A, e.g., a representation of the file system 112A at a second point in time. During the time between the first snapshot 113 and the second snapshot 114, some of the files and directories of the file system 112A may have changed.

A change detection component 116 can be configured to compare the first snapshot 113 and the second snapshot 114 in order to detect the file system 112A changes. The change detection component 116 can output detected changes 117, wherein detected changes 117 identifies the changes to the file system 112A between the first snapshot 113 and the second snapshot 114. The detected changes 117 can then be used to update the replicated file system 112B, so that the replicated file system 112B continues to accurately replicate the file system 112A.

In FIG. 1, the clusters 110, 120 can comprise groups of connected computing devices that operate cooperatively. The clusters 110, 120 can optionally be geographically distributed so that local circumstances, e.g., power outages, that affect one of the clusters 110 do not also impact the other cluster 120. Embodiments of this disclosure need not necessarily involve clusters 110, 120. Instead, the clusters 110, 120 can optionally be replaced by any other computing equipment. In some embodiments, a file system 112A can be replicated and stored redundantly within a single computing device, e.g., by storing the file system 112A and the replicated file system 112B in different storage volumes that are both within or coupled with a same computing device, cluster, or other computing equipment.

The file system 112A is one example of data that can be replicated. Embodiments of this disclosure can be optionally be used in connection with other data. Any data that can be changed by both changing the content of some aspects of the data, e.g., files, and changing namespaces of some aspects of the data, e.g., namespaces of files and directory entries, can benefit from techniques according to this disclosure.

The snapshots 113 and 114 can optionally be supplemented by any number of intermediate snapshots that represent states of the file system 112A between the first snapshot 113 and the second snapshot 114. Some of the processing techniques described herein can include processing the intermediate snapshots. Also, while the example illustrated in FIG. 1 contemplates snapshots at different points in time, it is also possible for snapshots 113 and 114 to instead (or additionally) represent the file system 112A at different locations. For example, in some embodiments, a first snapshot could represent the file system 112A while a second snapshot could represent the replicated file system 112B.

Figure 2:
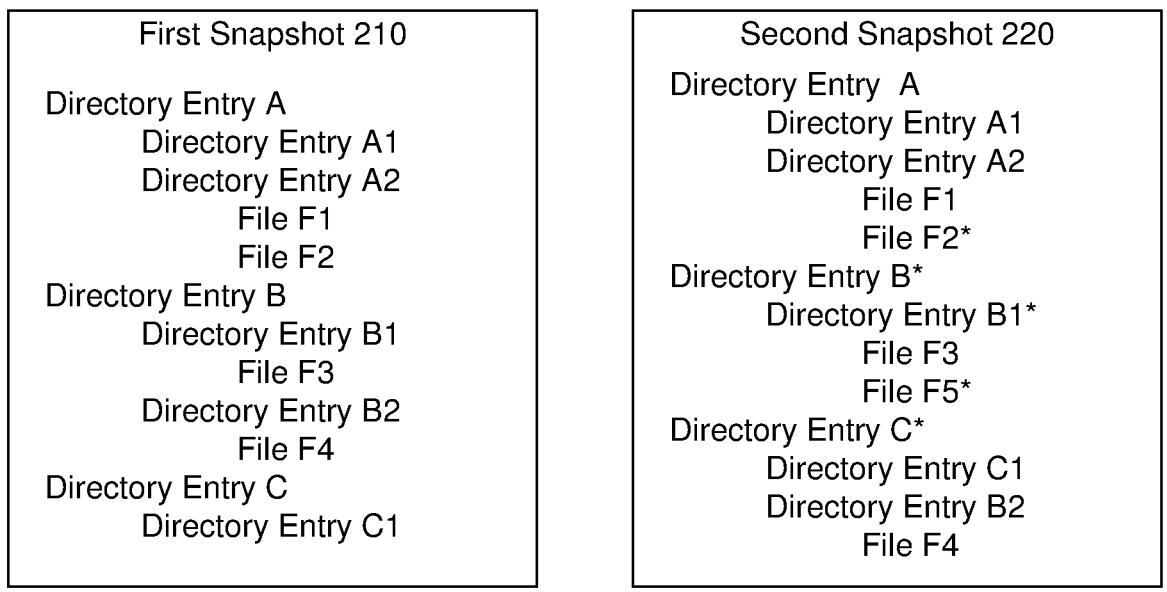
FIG. 2 illustrates example file system snapshots, wherein files and directories of the file system have changed between the different file system snapshots, in accordance with one or more embodiments described herein.

FIG. 2 illustrates example file system snapshots, wherein files and directories of the file system have changed between the different file system snapshots, in accordance with one or more embodiments described herein. FIG. 2 includes a first snapshot 210 and a second snapshot 220. The first snapshot 210 can implement, e.g., the first snapshot 113 illustrated in FIG. 1, and the second snapshot 220 can implement, e.g., the second snapshot 114 illustrated in FIG. 1.

The first snapshot 210 and the second snapshot 220 generally include directories and files. Directories can include any number of directory entries, and directory entries can include further directory entries as well as files. Files include file content. Changes to a file system can include file modifications, i.e., changes to file content, metadata, and/or namespace modifications. Namespace modifications can include, e.g., an addition, deletion, or move of a file or a directory entry.

In the example illustrated in FIG. 2, the first snapshot 210 includes example directories identified by Directory Entry A, Directory Entry B, and Directory Entry C. Directory Entry A comprises Directory Entry A1 and Directory Entry A2. Directory Entry A2 comprises File F1 and File F2. Directory Entry B comprises Directory Entry B1 and Directory Entry B2. Directory Entry B1 comprises File F3, and Directory Entry B2 comprises File F4. Directory Entry C comprises Directory Entry C1.

The second snapshot 220 includes example changes indicated by a * symbol. For example, the content of File F2 was changed, so that the content of File F2 in the second snapshot 220 is different from the content of File F2 in the first snapshot 210. Directory Entry B was also changed, by the removal of Directory Entry B2 and its contents (File F4). Directory Entry B1 was changed, by the addition of new File F5. Directory Entry C was also changed, by the addition of Directory Entry B2 and its contents (File F4). FIG. 2 illustrates some example file and namespace changes that can occur between snapshots. In general, files and directory entries can be added, deleted, moved, or modified.

Figure 3:
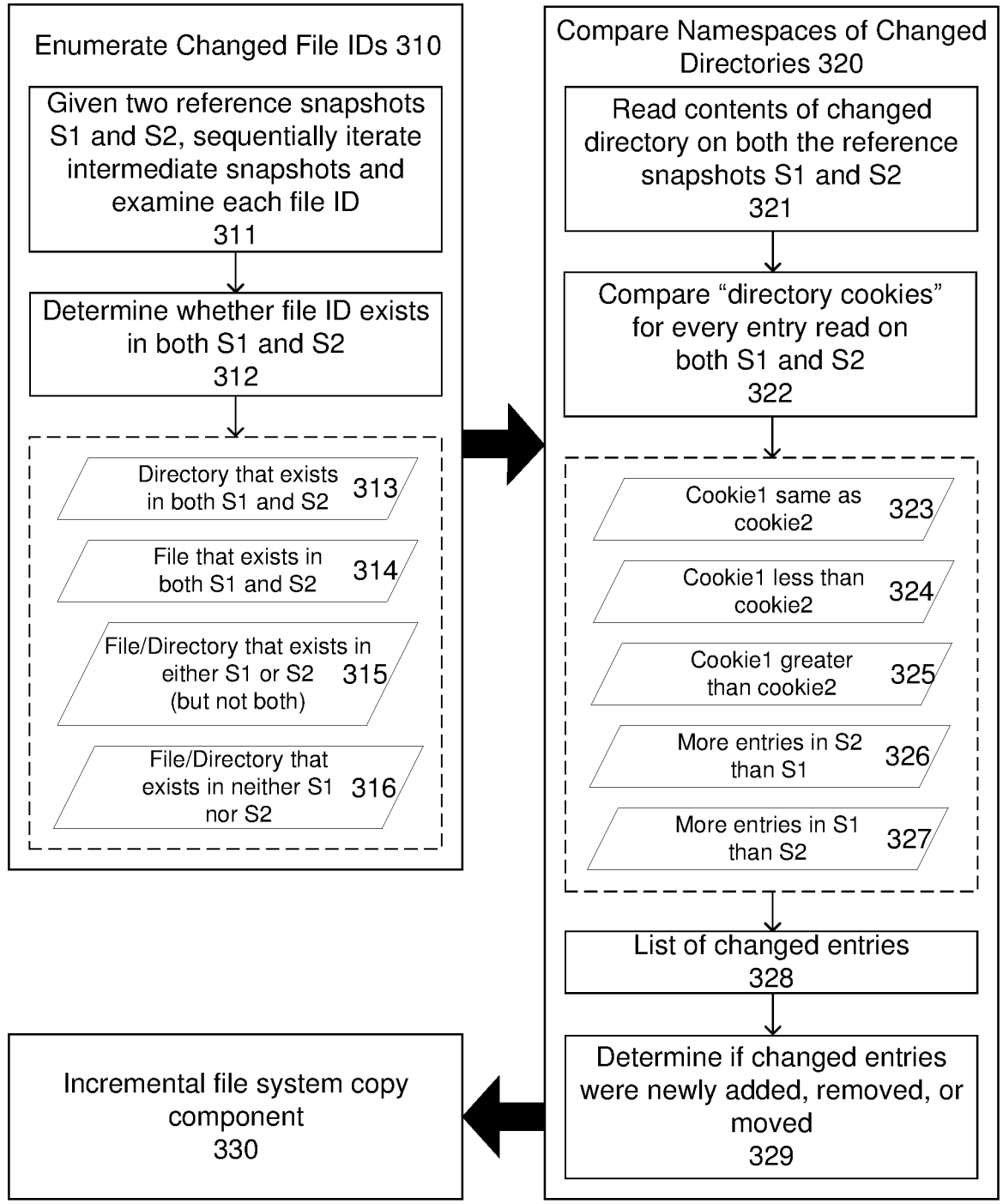
FIG. 3 illustrates example processing of different file system snapshots to detect file system changes between the different file system snapshots, in accordance with one or more embodiments described herein.

FIG. 3 illustrates example processing of different file system snapshots to detect file system changes between the different file system snapshots, in accordance with one or more embodiments described herein. The processing operations illustrated in FIG. 3 can implement the change detection component 116 illustrated in FIG. 1, in some embodiments. FIG. 3 comprises an "enumerate changed file IDs" operation 310, and a "compare namespaces of changed directories" operation 320. Each of the operations 310 and 320 comprise various elements, discussed below.

In general, the operations 310 and 320 can be operable to identify changes between a first snapshot and a second snapshot, e.g., between snapshots 113 and 114, illustrated in FIG. 1. Identified changes, e.g., the detected changes 117 illustrated in FIG. 1, can be provided to "incremental file system copy component" 330, and the "incremental file system copy component" 330 can be configured to replicate the detected changes 117 in a replicated file system such as 112B.

FIG. 3 illustrates a process to efficiently detect file system changes between two different snapshots produced by a snapshots-based file system. For example, the Isilon OneFS file system made by DELL® includes a snapshot feature which provides a powerful mechanism to browse and access a file system at a certain point in time. The process illustrated in FIG. 3 is considerably more efficient and scalable than, e.g., a brute-force namespace traversal technique.

For the purpose of the discussion of FIG. 3, the term "file ID" refers to a unique identifier, similar to an inode, that can identify a file or a directory entry. Elsewhere in this disclosure, the terms file identifier and directory identifier may be used in a manner that distinguishes between identifiers of files (file identifiers) and identifiers of directory entries (directory identifiers). A same type of identifier, e.g. a string of letters and/or numbers, can be used in connection with file identifiers and directory identifiers.

The process illustrated in FIG. 3 assumes a file system provides at least two functions, both of which are available for example in Isilon OneFS. These functions are: a) the ability to acquire file IDs (of files and directories) that have been modified between two snapshots; and b) the ability to efficiently detect whether a file with the given file ID is referenced from a namespace in a specific snapshot.

The process for detecting namespace changes shown in FIG. 3 can be described via two top level operations, namely, operations 310 and 320. Operation 310 comprises, "enumerate changed file IDs," and will be described first. The process involved in operation 310 assumes the following characteristics of file IDs that are considered as modified between snapshots.

First, a namespace change causes both a change to the file itself and changes to any parent directories of the namespace change. For example, if a file is linked into a directory, two file IDs will be considered changed: the file ID of the file itself and the file ID of the directory the file was linked into. Similarly, if a file is moved between two directories, there will be a total of three file IDs listed as changed: the file, the directory the file was moved out of, and the directory the file was moved into.

Second, the list of modified file IDs between two snapshots may not necessarily contain a complete listing of changed files. For example, if a directory tree is moved into a snapshot tree, there will be two changed file IDs: the directory that was moved, and the parent directory it was moved into. However, the children of the moved directory will not be reflected as changed in the list.

At operation 311, given two reference input snapshots (S1 and 52) from the file system, operation 311 can sequentially iterate any intermediate snapshots between the two reference snapshots and examine each file ID found. As noted above, file IDs can represent changed files and/or changed directories.

At operation 312, using the file system ability to check whether a given file ID is in a given snapshot, operation 312 can determine whether each file ID exists in both the older (S1) snapshot and newer (S2) snapshot. The outcome of the determinations made at operation 312 can comprise any of 313-316.

At 313, a file ID may be determined to identify a directory that exists in both snapshots S1 and S2. This can imply/indicate that the directory contents have changed. In this scenario, the file ID can be processed in operation 320. Other file IDs processed at operation 312 will fall into 314, 315, or 316.

At 314, a file ID may be determined to identify a file that exists in both snapshots S1 and S2. This means the file content and/or file metadata has changed between the snapshots, but the namespace associated with this file has not necessarily changed. Any namespace changes can be detected in operation 320.

At 315, a file ID may be determined to identify a file or directory that exists in one snapshot but not the other snapshot. This can imply/indicate that the file/directory is either newly added or deleted. Also, this can imply/indicate a namespace change of the file or directory, which can be ignored because it can be captured in operation 320 when the parent directory is processed.

At 316, a file ID may be determined to identify a file or directory that is in neither snapshot. This is an unrelated change and can optionally be skipped entirely in some embodiments.

FIG. 4 is a table comprising example actions that can be taken in different processing scenarios, in accordance with one or more embodiments described herein. FIG. 4 arranges the various processing scenarios introduced at 313-316 in a table format, including the actions taken in accordance with each scenario. As illustrated in FIG. 4, a file ID can identify a file (row 1), or a directory (row 2). Each file ID can exist in either both snapshots (column 1), one snapshot but not the other snapshot (column 2), or neither snapshot (column 3).

When a file ID identifies a file that exists in both snapshots, the file ID can be ignored in the context of namespace changes. When a file ID identifies a file that exists in one snapshot but not the other, the file ID can be ignored in the context of namespace changes. When a file ID identifies a file that exists in neither snapshot, the file ID can be ignored.

When a file ID identifies a directory that exists in both snapshots, the file ID can be processed in the "compare namespaces" step, namely, operation 320. When a file ID identifies a directory that exists in one snapshot but not the other, the file ID can be ignored in the context of namespace changes. When a file ID identifies a directory that exists in neither snapshot, the file ID can be ignored.

Returning now to operation 310 illustrated in FIG. 3, it is noted that a file ID can be changed in multiple intermediate snapshots, however, it is unnecessary to report it as modified more than once. Deduplication processing, such as maintaining a list of already processed modified file IDs, can be used to avoid processing file IDs more than once.

Operation 320 comprises, "compare namespaces of changed directories," and will be described next. Operation 320 can comprise a directory compare task and can be configured to detect the namespace changes in a changed directory identified at operation 310. At 321, the process can first read the contents of the changed directory on both the reference snapshots (S1 and S2). At 322, the process can next compare "directory cookies" for every entry read on both the snapshots. Directory cookies can comprise the hash values of directory entry names. The comparison performed at operation 322 can be better understood by reference to FIG. 5.

Figure 5:
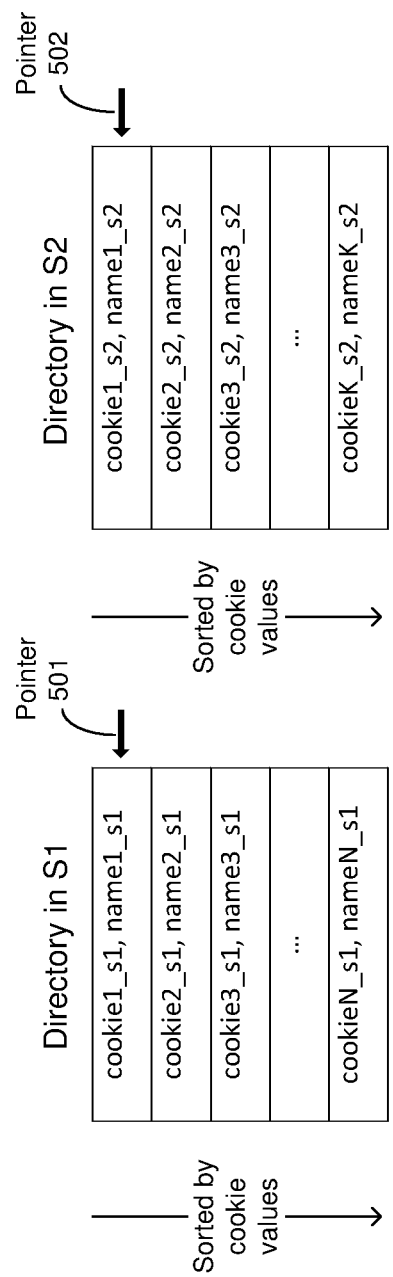
FIG. 5 illustrates two example lists of directory entry hashes, each of which is associated with a different snapshot, wherein the directory entry hashes can be compared in order to detect namespace changes between the different snapshots, in accordance with one or more embodiments described herein.

FIG. 5 illustrates two example lists of directory entry hashes, each of which is associated with a different snapshot, wherein the directory entry hashes can be compared in order to detect namespace changes between the different snapshots, in accordance with one or more embodiments described herein. Directory entry hashes are also referred to herein as "directory cookies." On the left is a list of directory entry hashes for the directory in snapshot 1 (S1). On the right is a list of directory entry hashes for the directory in snapshot 2 (S2). Each of the lists can be sorted by cookie/hash values, e.g., sorted numerically from low to high, or otherwise sorted according to any sorting scheme, as desired. A first pointer 501 can refer to a directory entry hash in the first sorted list, and a second pointer 502 can be refer to a directory entry hash in the second sorted list. The directory entry hashes referred to at pointers 501 and 502 can be compared, and different actions can be taken depending on whether the directory entry hashes match or not. The pointers 501 and 502 can be advanced sequentially through the lists. In some cases, one pointer 501 or 502 may be advanced while the other pointer is not advanced. In other cases, both pointers 501 and 502 be advanced concurrently.

Returning now to operation 320, assume a directory cookie referred to as "cookie1" is a directory cookie from snapshot S1, and a directory cookie referred to as "cookie2" is a directory cookie from snapshot S2. Elements 323-327 represent the possible results of comparing cookie1 and cookie2, each of which can trigger a different processing response.

At 323, if cookie1 is the same as cookie2, then there was no change between S1 and S2. Embodiments can double check by comparing file properties to ensure that both snapshots in fact include the same file, in order to safeguard against scenarios wherein a file "X" has been deleted and a new file was created with the same name "X".

At 324, if cookie1 is less than cookie2, then the file/directory represented by cookie1 has been unlinked/removed. The unlink or removal of the file/directory can be added to the list of changes between the snapshots.

At 325, if cookie1 is greater than cookie2, then file/directory represented by cookie2 has been added. The addition of the file/directory can be added to the list of changes between the snapshots.

At 326, if there are more entries in S2 compared to S1, this implies that new files have been added. The addition of new files can be added to the list of changes between the snapshots.

At 327, if there are more entries in S1 compared to S2, this implies that files have been removed. The removal of files can be added to the list of changes between the snapshots.

Operation 322 can generate a list of changed entries 328 which can be available for further processing, along with associated file IDs. The list of changed entries 328 includes information about whether file IDS are linked or unlinked with respect to a directory.

Operation 329 can process the list of changed entries 328 to determine if a file/directory in the list 328 has been newly added, removed, or moved to/from a different directory. Operation 329 can check whether a file/directory in the list 328 exists in the snapshot on both S1 and S2. If a file/directory exists in both snapshots, then either this file/directory has been moved from/to different directory or its link count has changed (as a result of link/unlink operations) and remains greater than zero. If a file/directory exists in snapshot S1 and does not exist in snapshot S2, then the file/directory has been deleted. If a file/directory does not exist in snapshot S1 but exists in snapshot S2, then the file/directory has been newly added (and has at least one link).

The output of operation 329 can comprise, e.g., detected changes 117 such as illustrated in FIG. 1, which can later be used by an incremental file system copy component 330 configured to replicate a file system between storage systems.

Figure 6:
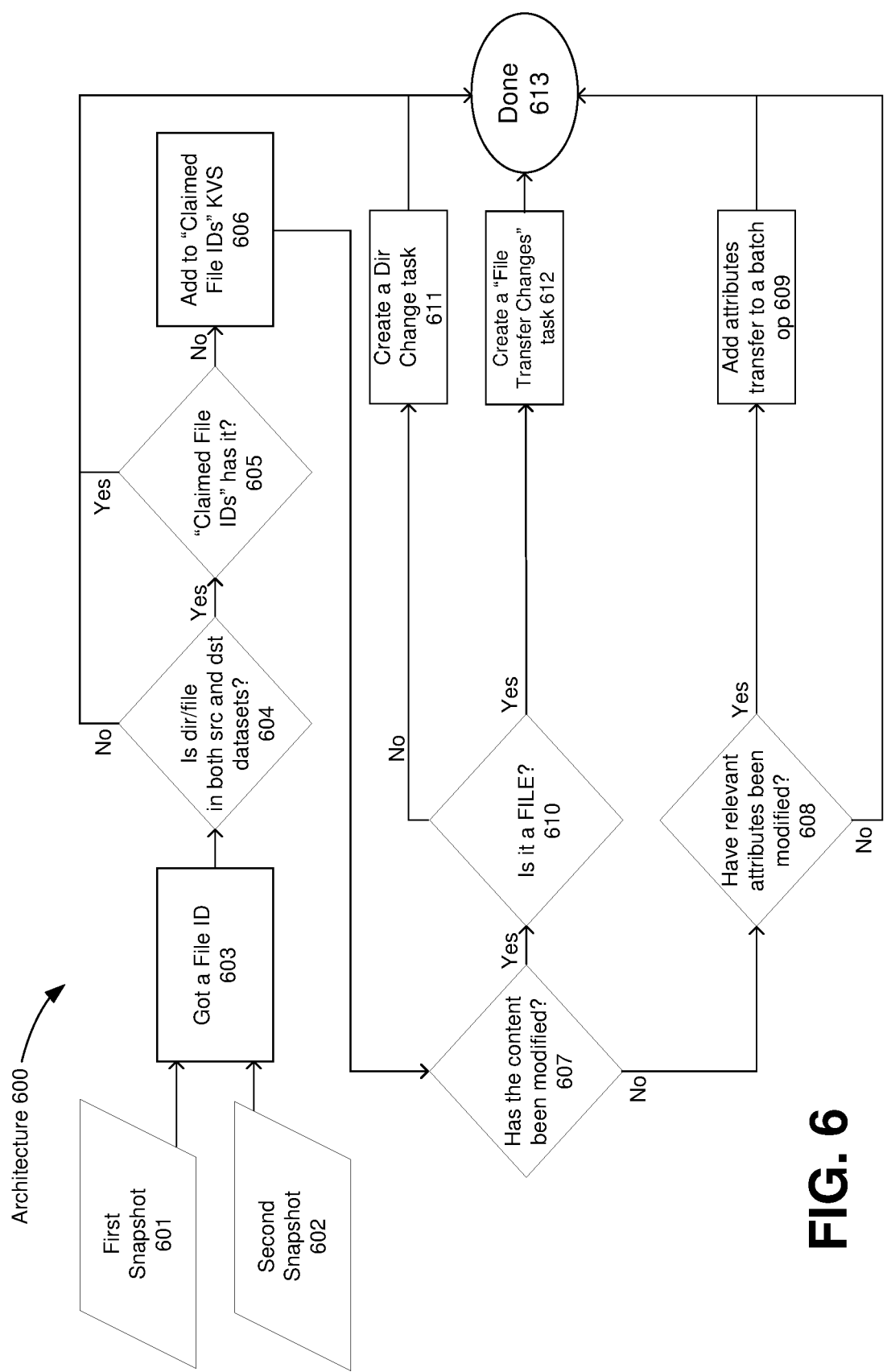
FIG. 6 illustrates an example change detection architecture and processing operations thereof, in accordance with one or more embodiments described herein.

FIG. 6 illustrates an example change detection architecture and processing operations thereof, in accordance with one or more embodiments described herein. The example change detection architecture 600 can be adapted to process a first snapshot 601 and a second snapshot 602 in order to detect changes between the first and second snapshots 601, 602. The example change detection architecture 600 can comprise "got a File ID" 603, followed by "is directory/file in both source and destination datasets?" 604. If no at 604, proceed to done 613. If yes at 604, the next operation is, "Claimed File IDs has it?" 605. If yes at 605, proceed to done 613. If no at 605, proceed to "add to "Claimed File IDs" KVS (key value store)" 606.

Operation 606 is followed by "has the content been modified?" 607. If no at 607, proceed to, "have relevant attributes been modified?" 608. If yes at 607, proceed to "is it a FILE?" 610. If no at 608, proceed to done 613. If yes at 608, proceed to, "add attributes transfer to a batch operation" 609. Attributes transfer can include, e.g. metadata transfer. If no at 610, proceed to "create a directory change task" 611. If yes at 610, proceed to, "create a file transfer changes task" 612. Operations 609, 611, and 612 can be followed by done 613.

Figure 7:
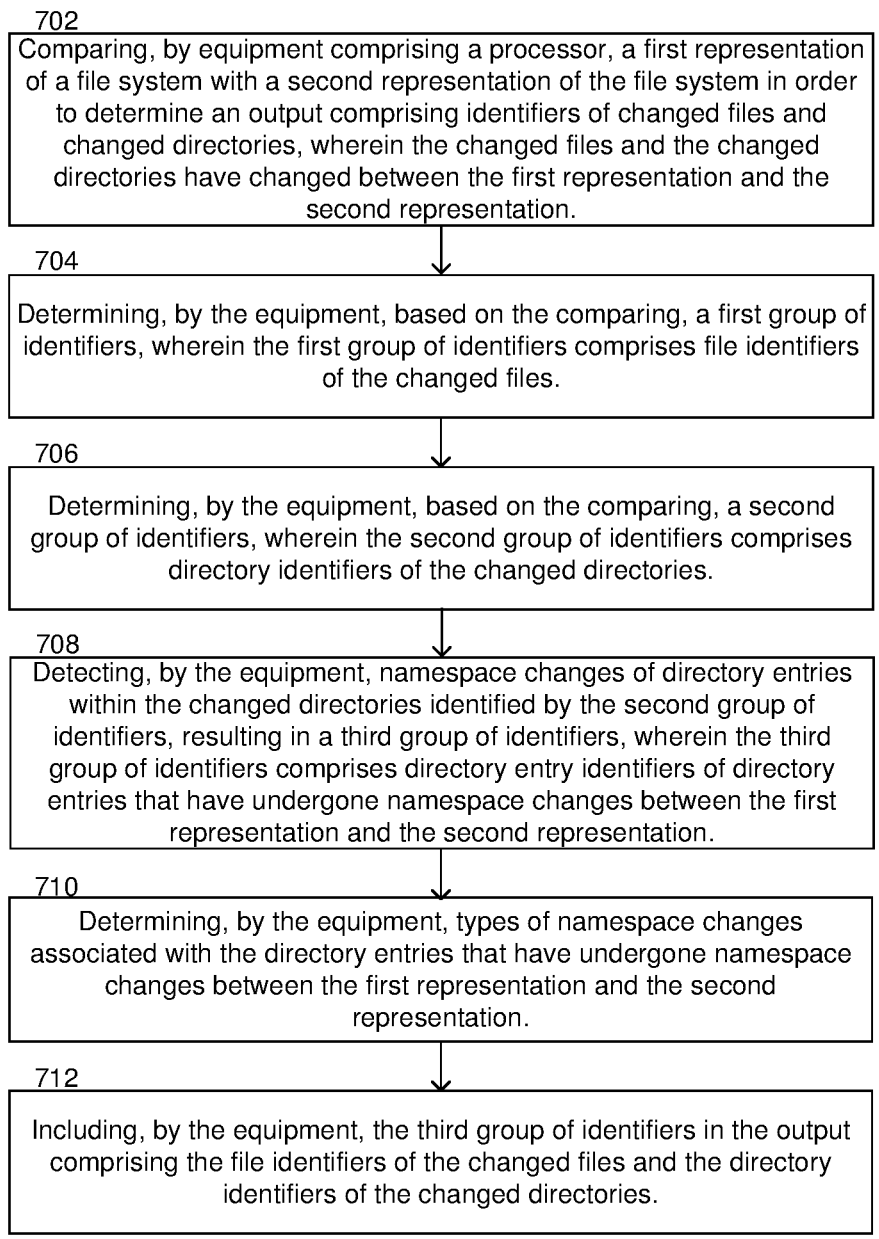
FIG. 7 is a flow diagram of an example, non-limiting computer implemented method to detect changes between a first representation of a file system and a second representation of the file system, in accordance with one or more embodiments described herein.

FIG. 7 is a flow diagram of an example, non-limiting computer implemented method to detect changes between a first representation of a file system and a second representation of the file system, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by equipment implementing a change detection component 116 such as illustrated in FIG. 1. Operation 702 comprises comparing, by equipment comprising a processor, a first representation of a file system 112A, e.g., the first snapshot 113, with a second representation of the file system 112A, e.g., the second snapshot 114, in order to determine an output, e.g., detected changes 117, comprising identifiers of changed files and changed directories, wherein the changed files and the changed directories have changed between the first representation 113 and the second representation 114.

In some embodiments, the first representation 113 can represent the file system 112A at a first storage cluster 110, and the second representation 114 can represent the file system 112A at a second storage cluster 120—for example, the second representation 114 can represent the replicated file system 112B. In some embodiments, the first representation 113 can represent the file system 112A at a first time, and the second representation 114 can represent the file system 112A at a second time, wherein the second time can be some interval later than the first time.

In some embodiments, comparing the first representation 113 of the file system 112A with the second representation 114 of the file system 112A can comprise comparing at least one intermediate representation of the file system 112A, e.g., an intermediate snapshot, with at least one of the first representation 113 of the file system 112A or the second representation 114 of the file system 112A.

Operation 704 comprises determining, by the equipment, based on the comparing performed at operation 702, a first group of identifiers, wherein the first group of identifiers comprises file identifiers of the changed files. This first group is described for example in connection with element 314 of FIG. 3. Operation 706 comprises determining, by the equipment, based on the comparing performed at operation 702, a second group of identifiers, wherein the second group of identifiers comprises directory identifiers of the changed directories. This second group is described for example in connection with element 313 of FIG. 3.

Operation 708 comprises detecting, by the equipment, namespace changes of directory entries within the changed directories identified by the second group of identifiers, resulting in a third group of identifiers, wherein the third group of identifiers comprises directory entry identifiers of directory entries that have undergone namespace changes between the first representation 113 and the second representation 114. This third group is described for example in connection with elements 324 and 325 of FIG. 3.

In some embodiments, detecting the namespace changes of the directory entries within the changed directories identified by the second group of identifiers, at operation 708, can comprise comparing at least one first directory entry hash of a first directory entry associated with the first representation 113 with at least one second directory entry hash of a second directory entry associated with the second representation 114. Comparison of directory entry hashes is described in connection with FIG. 5. Comparing hashes can comprise, e.g., advancing a first pointer 501 through first directory entry hashes associated with the first representation 113 and advancing a second pointer 502 through second directory entry hashes associated with the second representation 114.

Operation 710 comprises determining, by the equipment, types of namespace changes associated with the directory entries that have undergone namespace changes between the first representation 113 and the second representation 114. The types of namespace changes can comprise, e.g., a newly added type, a removed type, and a moved type.

Operation 712 comprises including, by the equipment, the third group of identifiers (identifiers pursuant to operation 708) in the output 117 comprising the file identifiers of the changed files and the directory identifiers of the changed directories.

Figure 8:
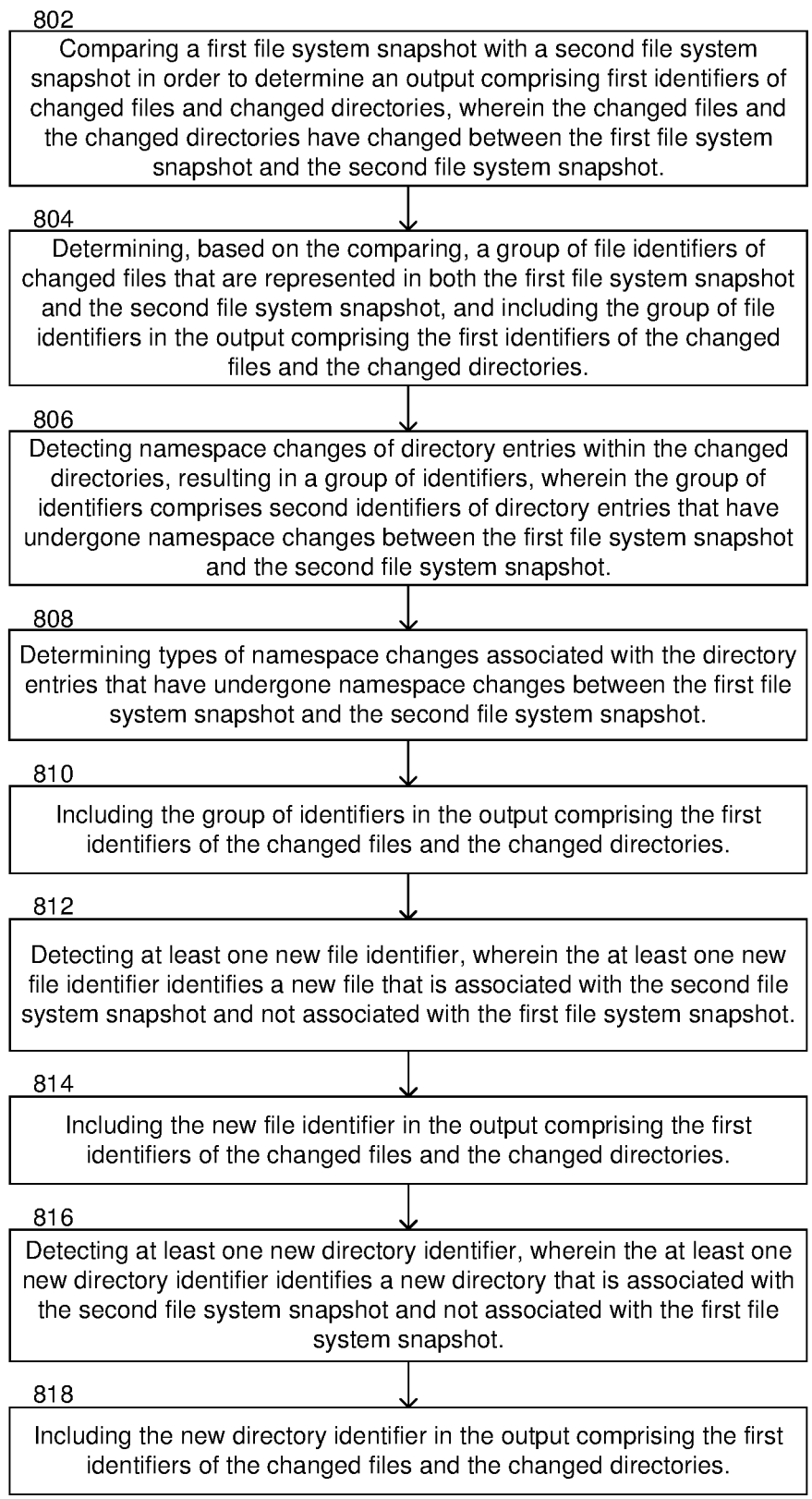
FIG. 8 is a flow diagram of another example, non-limiting computer implemented method to detect changes between a first file system snapshot and a second file system snapshot, in accordance with one or more embodiments described herein.

FIG. 8 is a flow diagram of another example, non-limiting computer implemented method to detect changes between a first file system snapshot and a second file system snapshot, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by equipment implementing a change detection component 116 such as illustrated in FIG. 1. Operation 802 comprises comparing a first file system snapshot 113 with a second file system snapshot 114 in order to determine an output 117 comprising first identifiers of changed files and changed directories, wherein the changed files and the changed directories have changed between the first file system snapshot 113 and the second file system snapshot 114.

In some embodiments, comparing the first file system snapshot 113 with the second file system snapshot 114 at operation 802 can comprise comparing at least one intermediate file system snapshot with at least one of the first file system snapshot 113 or the second file system snapshot 114.

Operation 804 comprises determining, based on the comparing at operation 802, a group of file identifiers of changed files that are represented in both the first file system snapshot 113 and the second file system snapshot 114, and including the group of file identifiers in the output 117 comprising the first identifiers of the changed files and the changed directories.

Operation 806 comprises detecting namespace changes of directory entries within the changed directories, resulting in a group of identifiers, wherein the group of identifiers comprises second identifiers of directory entries that have undergone namespace changes between the first file system snapshot 113 and the second file system snapshot 114.

In some embodiments, detecting the namespace changes of the directory entries within the changed directories at operation 806 can comprise comparing at least one first directory entry hash of a first directory entry associated with the first file system snapshot 113 with at least one second directory entry hash of a second directory entry associated with the second file system snapshot 114, e.g., as illustrated in FIG. 5. In some embodiments, detecting the namespace changes of the directory entries within the changed directories at operation 806 can comprise advancing a first pointer 501 through first directory entry hashes associated with the first file system snapshot 113 and advancing a second pointer 502 through second directory entry hashes associated with the second file system snapshot 114.

Operation 808 comprises determining types of namespace changes associated with the directory entries that have undergone namespace changes between the first file system snapshot 113 and the second file system snapshot 114. The types of namespace changes can comprise, e.g., a newly added type, a removed type, and a moved type.

Operation 810 comprises including the group of identifiers (resulting from operation 806) in the output 117 comprising the first identifiers of the changed files and the changed directories.

Operation 812 comprises detecting at least one new file identifier, wherein the at least one new file identifier identifies a new file that is associated with the second file system snapshot 114 and not associated with the first file system snapshot 113. Operation 814 comprises including the new file identifier in the output 117 comprising the first identifiers of the changed files and the changed directories.

Operation 816 comprises detecting at least one new directory identifier, wherein the at least one new directory identifier identifies a new directory that is associated with the second file system snapshot 114 and not associated with the first file system snapshot 113. Operation 818 comprises including the new directory identifier in the output 117 comprising the first identifiers of the changed files and the changed directories.

Figure 9:
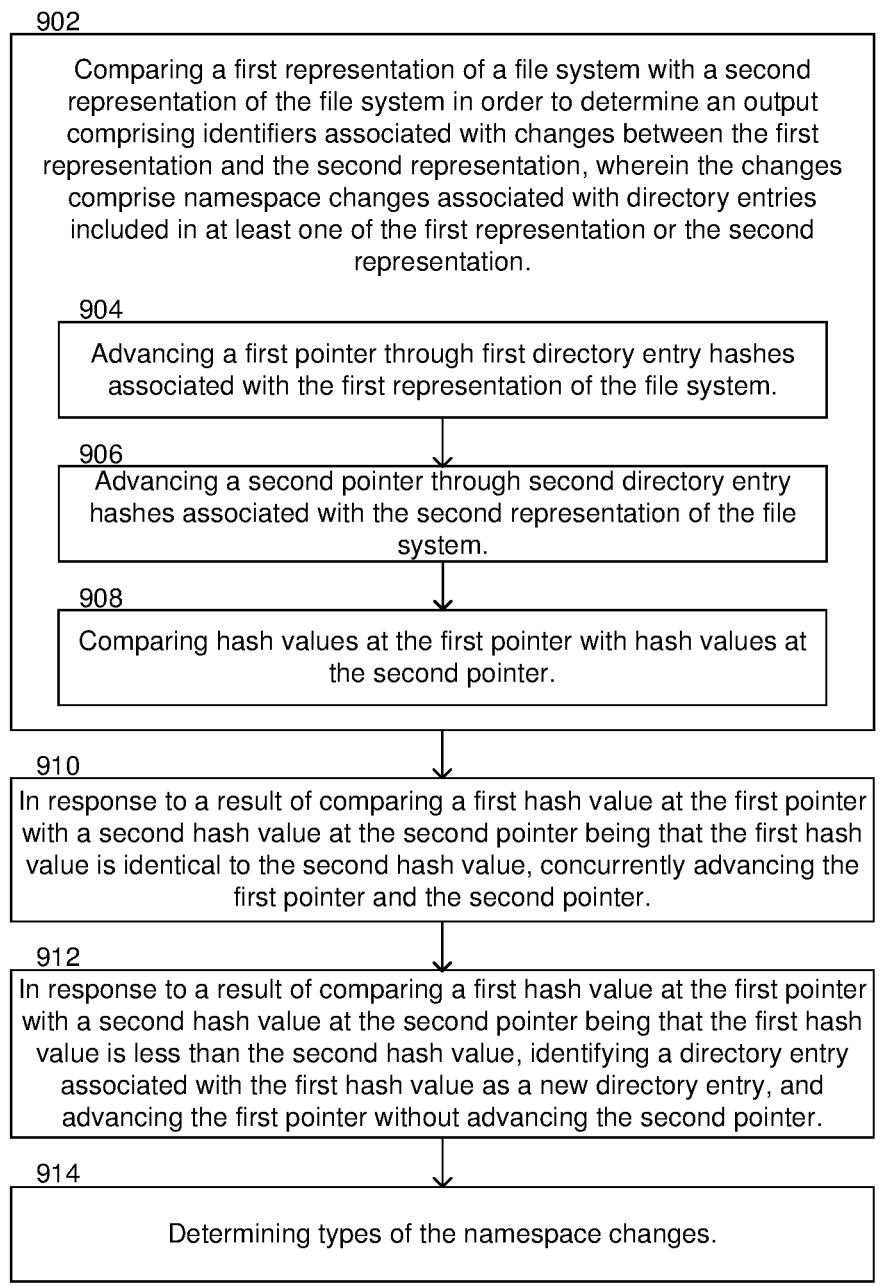
FIG. 9 is a flow diagram of another example, non-limiting computer implemented method to detect changes between a first representation of a file system and a second representation of the file system, in accordance with one or more embodiments described herein.

FIG. 9 is a flow diagram of another example, non-limiting computer implemented method to detect changes between a first representation of a file system and a second representation of the file system, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by equipment implementing a change detection component 116 such as illustrated in FIG. 1. Operation 902 comprises comparing a first representation 113 of a file system 112A with a second representation 114 of the file system 112A in order to determine an output 117 comprising identifiers associated with changes between the first representation 113 and the second representation 114, wherein the changes comprise namespace changes associated with directory entries included in at least one of the first representation 113 or the second representation 114.

Determining the namespace changes can comprise operations 904, 906, and 908. Operation 904 comprises advancing a first pointer 501 through first directory entry hashes associated with the first representation 113 of the file system 112A; operation 906 comprises advancing a second pointer 502 through second directory entry hashes associated with the second representation 114 of the file system 112A; and operation 908 comprises comparing hash values at the first pointer 501 with hash values at the second pointer 502.

Operation 910 comprises, in response to a result of comparing a first hash value at the first pointer 501 with a second hash value at the second pointer 502 being that the first hash value is identical to the second hash value, concurrently advancing the first pointer 501 and the second pointer 502.

Operation 912 comprises, in response to a result of comparing a first hash value at the first pointer 501 with a second hash value at the second pointer 502 being that the first hash value is less than the second hash value, identifying a directory entry associated with the first hash value as a new directory entry, and advancing the first pointer 501 without advancing the second pointer 502. Operations 910 and 912 are examples of operations described further in connection with FIG. 3.

Operation 914 comprises determining types of the namespace changes. As described herein, the types of the namespace changes can comprise, e.g., a moved type associated with moved directory entries, as well as newly added types and removed types.

Figure 10:
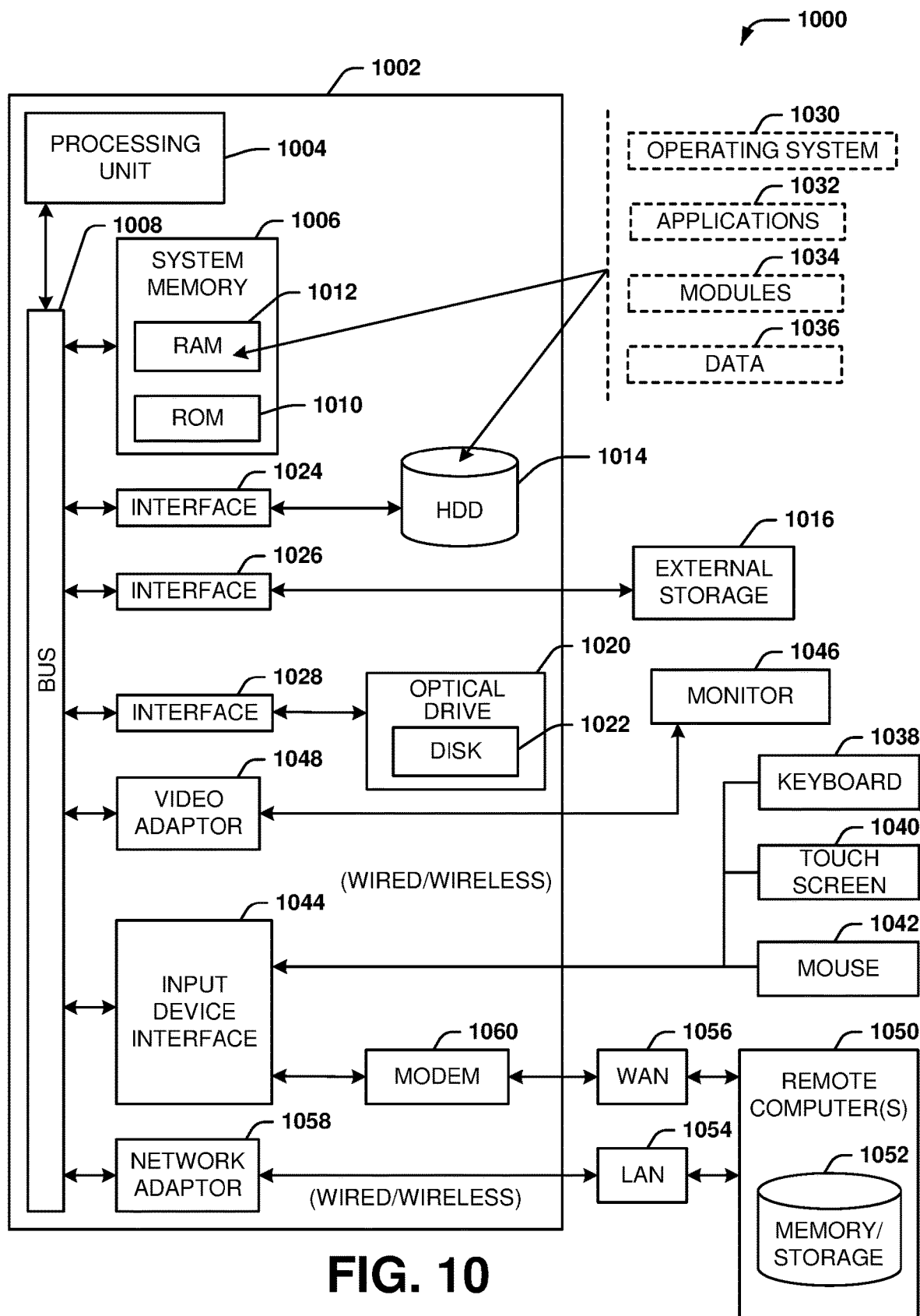
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    comparing, by equipment comprising a processor, a first representation of a file system with a second representation of the file system in order to determine an output comprising identifiers of changed files and changed directories, wherein the changed files and the changed directories have changed between the first representation and the second representation or between a previous representation of the file system and the first representation;
    determining, by the equipment, based on the comparing, a first group of identifiers, wherein the first group of identifiers comprises file identifiers of the changed files;
    in response to a determination that an identifier of the identifiers of the changed files and the changed directories exists in the first representation and the second representation, determining, by the equipment, based on the comparing, a second group of identifiers, wherein the second group of identifiers comprises directory identifiers of the changed directories;
    detecting, by the equipment, namespace changes of directory entries within the changed directories identified by the second group of identifiers, resulting in a third group of identifiers, wherein the third group of identifiers comprises directory entry identifiers of directory entries that have undergone namespace changes between the first representation and the second representation;
    including, by the equipment, the third group of identifiers in the output comprising the file identifiers of the changed files and the directory identifiers of the changed directories; and
    incrementally replicating, by the equipment, the file system of a first storage system to another file system of a second storage system according to the third group of identifiers.

2. The method of claim 1, wherein the first representation comprises a first snapshot representation, and wherein the second representation comprises a second snapshot representation.

3. The method of claim 1, wherein the first representation represents the file system at a first storage cluster, and wherein the second representation represents the file system at a second storage cluster.

4. The method of claim 1, wherein the first representation represents the file system at a first time, and wherein the second representation represents the file system at a second time.

5. The method of claim 1, wherein detecting the namespace changes of the directory entries within the changed directories identified by the second group of identifiers comprises comparing at least one first directory entry hash of a first directory entry associated with the first representation with at least one second directory entry hash of a second directory entry associated with the second representation.

6. The method of claim 1, wherein detecting the namespace changes of the directory entries within the changed directories identified by the second group of identifiers comprises advancing a first pointer through first directory entry hashes associated with the first representation and advancing a second pointer through second directory entry hashes associated with the second representation.

7. The method of claim 1, further comprising determining, by the equipment, types of namespace changes associated with the directory entries that have undergone namespace changes between the first representation and the second representation, wherein the types of namespace changes comprise a newly added type, a removed type, and a moved type.

8. The method of claim 1, wherein comparing the first representation of the file system with the second representation of the file system comprises comparing at least one intermediate representation of the file system with at least one of the first representation of the file system or the second representation of the file system.

9. A system, comprising:
a processor; and
a memory that stores executable instructions that, when executed by the processor, facilitate performance of operations, comprising:
comparing a first file system snapshot with a second file system snapshot in order to determine an output comprising first identifiers of changed files and changed directories, wherein the changed files and the changed directories have changed between the first file system snapshot and the second file system snapshot or between a previous file system snapshot and the first file system snapshot;
in response to a determination that an identifier of the first identifiers of the changed files and the changed directories exists in the first file system snapshot and the second file system snapshot, detecting namespace changes of directory entries within the changed directories, resulting in a group of identifiers, wherein the group of identifiers comprises second identifiers of directory entries that have undergone namespace changes between the first file system snapshot and the second file system snapshot;
including the group of identifiers in the output comprising the first identifiers of the changed files and the changed directories; and
incrementally replicating a file system associated with the first file system snapshot to another file system according to the second identifiers.

10. The system of claim 9, wherein detecting the namespace changes of the directory entries within the changed directories comprises comparing at least one first directory entry hash of a first directory entry associated with the first file system snapshot with at least one second directory entry hash of a second directory entry associated with the second file system snapshot.

11. The system of claim 9, wherein detecting the namespace changes of the directory entries within the changed directories comprises advancing a first pointer through first directory entry hashes associated with the first file system snapshot and advancing a second pointer through second directory entry hashes associated with the second file system snapshot.

12. The system of claim 9, wherein the operations further comprise determining types of namespace changes associated with the directory entries that have undergone namespace changes between the first file system snapshot and the second file system snapshot, and wherein the types of namespace changes comprise a newly added type, a removed type, and a moved type.

13. The system of claim 9, wherein comparing the first file system snapshot with the second file system snapshot comprises comparing at least one intermediate file system snapshot with at least one of the first file system snapshot or the second file system snapshot.

14. The system of claim 9, wherein the operations further comprise determining, based on the comparing, a group of file identifiers of changed files that are represented in both the first file system snapshot and the second file system snapshot, and including the group of file identifiers in the output comprising the first identifiers of the changed files and the changed directories.

15. The system of claim 9, wherein the operations further comprise:
detecting at least one new file identifier, wherein the at least one new file identifier identifies a new file that is associated with the second file system snapshot and not associated with the first file system snapshot; and
including the new file identifier in the output comprising the first identifiers of the changed files and the changed directories.

16. The system of claim 9, wherein the operations further comprise:
detecting at least one new directory identifier, wherein the at least one new directory identifier identifies a new directory that is associated with the second file system snapshot and not associated with the first file system snapshot; and
including the new directory identifier in the output comprising the first identifiers of the changed files and the changed directories.

17. A non-transitory machine-readable medium, comprising executable instructions that, when executed by a processor, facilitate performance of operations, comprising:
comparing a first representation of a file system with a second representation of the file system in order to determine an output comprising identifiers associated with changes between the first representation and the second representation, or between a previous representation of the file system and the first representation,
wherein the changes comprise namespace changes associated with directory entries included in both the first representation and the second representation, and wherein determining the namespace changes comprises:
advancing a first pointer through first directory entry hashes associated with the first representation of the file system;
advancing a second pointer through second directory entry hashes associated with the second representation of the file system;
comparing hash values at the first pointer with hash values at the second pointer; and
incrementally replicating the file system to another file system according to the identifiers.

18. The non-transitory machine-readable medium of claim 17, wherein the operations further comprise, in response to a result of comparing a first hash value at the first pointer with a second hash value at the second pointer being that the first hash value is identical to the second hash value, concurrently advancing the first pointer and the second pointer.

19. The non-transitory machine-readable medium of claim 17, wherein the operations further comprise, in response to a result of comparing a first hash value at the first pointer with a second hash value at the second pointer being that the first hash value is less than the second hash value, identifying a directory entry associated with the first hash value as a new directory entry, and advancing the first pointer without advancing the second pointer.

20. The non-transitory machine-readable medium of claim 17, wherein the operations further comprise determining types of the namespace changes, and wherein the types of the namespace changes comprise at least a moved type associated with moved directory entries.

* * * * *